(12) United States Patent
Asghari et al.

(10) Patent No.: US 9,705,993 B1
(45) Date of Patent: Jul. 11, 2017

(54) INFORMATION EXCHANGE BETWEEN A DIRECTORY ASSISTANCE APPLICATION SERVER AND A WEB-RTC ENGINE

(71) Applicant: Sprint Communications Company L.P., Overland Park, KS (US)

(72) Inventors: Abdolreza Asghari, Santa Clara, CA (US); Mark J. Bonn, Granite Bay, CA (US); Ehtesham Khan, Santa Clara, CA (US); James D. Kirby, San Mateo, CA (US); Dominick Mangiardi, Fremont, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 243 days.

(21) Appl. No.: 14/335,258

(22) Filed: Jul. 18, 2014

(51) Int. Cl.
*G06F 15/16* (2006.01)
*H04L 29/08* (2006.01)
*H04L 29/06* (2006.01)

(52) U.S. Cl.
CPC ........ *H04L 67/141* (2013.01); *H04L 65/1006* (2013.01); *H04L 65/1016* (2013.01); *H04L 65/1069* (2013.01)

(58) Field of Classification Search
CPC ............. H04L 65/1016; H04L 65/1006; H04L 67/141; H04L 65/1069
USPC ................................................. 709/227, 228
See application file for complete search history.

(56) References Cited

U.S. PATENT DOCUMENTS

| 2004/0249951 | A1* | 12/2004 | Grabelsky | H04L 29/06 709/227 |
| 2007/0165805 | A1* | 7/2007 | Altberg | G06Q 30/02 379/114.13 |
| 2007/0201646 | A1* | 8/2007 | Metcalf | H04M 15/06 379/142.01 |
| 2007/0297581 | A1* | 12/2007 | Kuo | H04L 12/66 379/93.26 |
| 2009/0041225 | A1* | 2/2009 | Agarwal | H04L 29/12584 379/221.13 |
| 2010/0198854 | A1* | 8/2010 | Chitturi | G06F 17/30864 707/760 |

(Continued)

FOREIGN PATENT DOCUMENTS

| CN | 103414835 | 11/2013 |
| WO | 2013108121 | 7/2013 |

(Continued)

*Primary Examiner* — Hieu Hoang (57) ABSTRACT

A directory assistance (DA) application server to facilitate directory assistance lookup requests involving a web real-time communication (WebRTC) engine comprises a communication transceiver and a processing system. The communication transceiver is configured to receive a first session initiation protocol (SIP) information message comprising a request for directory assistance data, wherein the request is expressed in an extensible markup language (XML) format. The processing system is configured to query a directory assistance database to retrieve the directory assistance data and process the directory assistance data to generate a second SIP information message comprising the directory assistance data expressed in the XML format. The communication transceiver is further configured to transfer the second SIP information message for delivery to the WebRTC engine.

20 Claims, 7 Drawing Sheets

(56) References Cited

U.S. PATENT DOCUMENTS

| | | | | |
|---|---|---|---|---|
| 2012/0027188 A1* | 2/2012 | Huynh | ............ | H04M 1/274516 |
| | | | | 379/93.23 |
| 2014/0044123 A1 | 2/2014 | Lawson et al. | | |
| 2014/0126715 A1* | 5/2014 | Lum | ................... | H04M 3/5133 |
| | | | | 379/265.09 |
| 2014/0222894 A1* | 8/2014 | Gangadharan | .......... | H04L 67/02 |
| | | | | 709/203 |
| 2014/0223452 A1* | 8/2014 | Santhanam | ........... | H04L 67/141 |
| | | | | 719/328 |
| 2014/0259127 A1* | 9/2014 | Shaw | .................. | H04L 63/0884 |
| | | | | 726/5 |
| 2014/0325078 A1* | 10/2014 | Shan | ................ | H04W 36/0066 |
| | | | | 709/227 |
| 2014/0344169 A1* | 11/2014 | Phelps | ................. | G06Q 30/016 |
| | | | | 705/304 |

FOREIGN PATENT DOCUMENTS

| | | |
|---|---|---|
| WO | 2013122949 | 8/2013 |
| WO | 2013155939 | 10/2013 |
| WO | 2014007708 | 1/2014 |
| WO | 2014019497 | 2/2014 |

\* cited by examiner

INFORMATION EXCHANGE BETWEEN A DIRECTORY ASSISTANCE APPLICATION SERVER AND A WEB-RTC ENGINE

TECHNICAL BACKGROUND

An internet protocol multimedia subsystem (IMS) is a network architectural framework that supports voice over internet protocol (VoIP), streaming media sessions, and other types of communication services. IMS is designed to enable delivery of real-time multimedia services to communication devices operated by users requesting these services. IMS typically utilizes the session initiation protocol (SIP) to facilitate communication session setup and tear-down. Essentially, IMS operates as a horizontal control layer that isolates an access network from the service layer that provides the content or services requested by the users.

In some cases, a caller may request a directory assistance service. Communication service providers often outsource directory assistance services such as 411 and NPA-555-1212 to directory assistance service providers by routing such calls to that service provider's directory assistance application sever. Directory assistance service providers commonly employ a web real-time communication (WebRTC) engine that works in conjunction with the application server and an operator's browser to provide directory assistance services in an IMS architecture. WebRTC is an application programming interface (API) that supports browser-to-browser applications for voice calls, video communications, peer-to-peer file sharing, and other real-time communication services. The directory assistance service provider typically maintains a database of telephone listings and related information that may be used to provide directory assistance services to callers requesting such information.

Overview

A method of operating a directory assistance (DA) application server to facilitate directory assistance lookup requests involving a web real-time communication (WebRTC) engine is disclosed. The method comprises receiving a first session initiation protocol (SIP) information message comprising a request for directory assistance data, wherein the request is expressed in an extensible markup language (XML) format. The method further comprises querying a directory assistance database to retrieve the directory assistance data. The method further comprises processing the directory assistance data to generate a second SIP information message comprising the directory assistance data expressed in the XML format. The method further comprises transferring the second SIP information message for delivery to the WebRTC engine.

A directory assistance (DA) application server to facilitate directory assistance lookup requests involving a web real-time communication (WebRTC) engine comprises a communication transceiver and a processing system. The communication transceiver is configured to receive a first session initiation protocol (SIP) information message comprising a request for directory assistance data, wherein the request is expressed in an extensible markup language (XML) format. The processing system is configured to query a directory assistance database to retrieve the directory assistance data and process the directory assistance data to generate a second SIP information message comprising the directory assistance data expressed in the XML format. The communication transceiver is further configured to transfer the second SIP information message for delivery to the WebRTC engine.

A computer apparatus to operate a directory assistance (DA) application server to facilitate directory assistance lookup requests involving a web real-time communication (WebRTC) engine comprises software instructions and at least one non-transitory computer-readable storage medium storing the software instructions. The software instructions are configured, when executed by the DA application server, to direct the DA application server to receive a first session initiation protocol (SIP) information message comprising a request for directory assistance data, wherein the request is expressed in an extensible markup language (XML) format. The software instructions are further configured to direct the DA application server to query a directory assistance database to retrieve the directory assistance data and process the directory assistance data to generate a second SIP information message comprising the directory assistance data expressed in the XML format. The software instructions are further configured to direct the DA application server to transfer the second SIP information message for delivery to the WebRTC engine.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
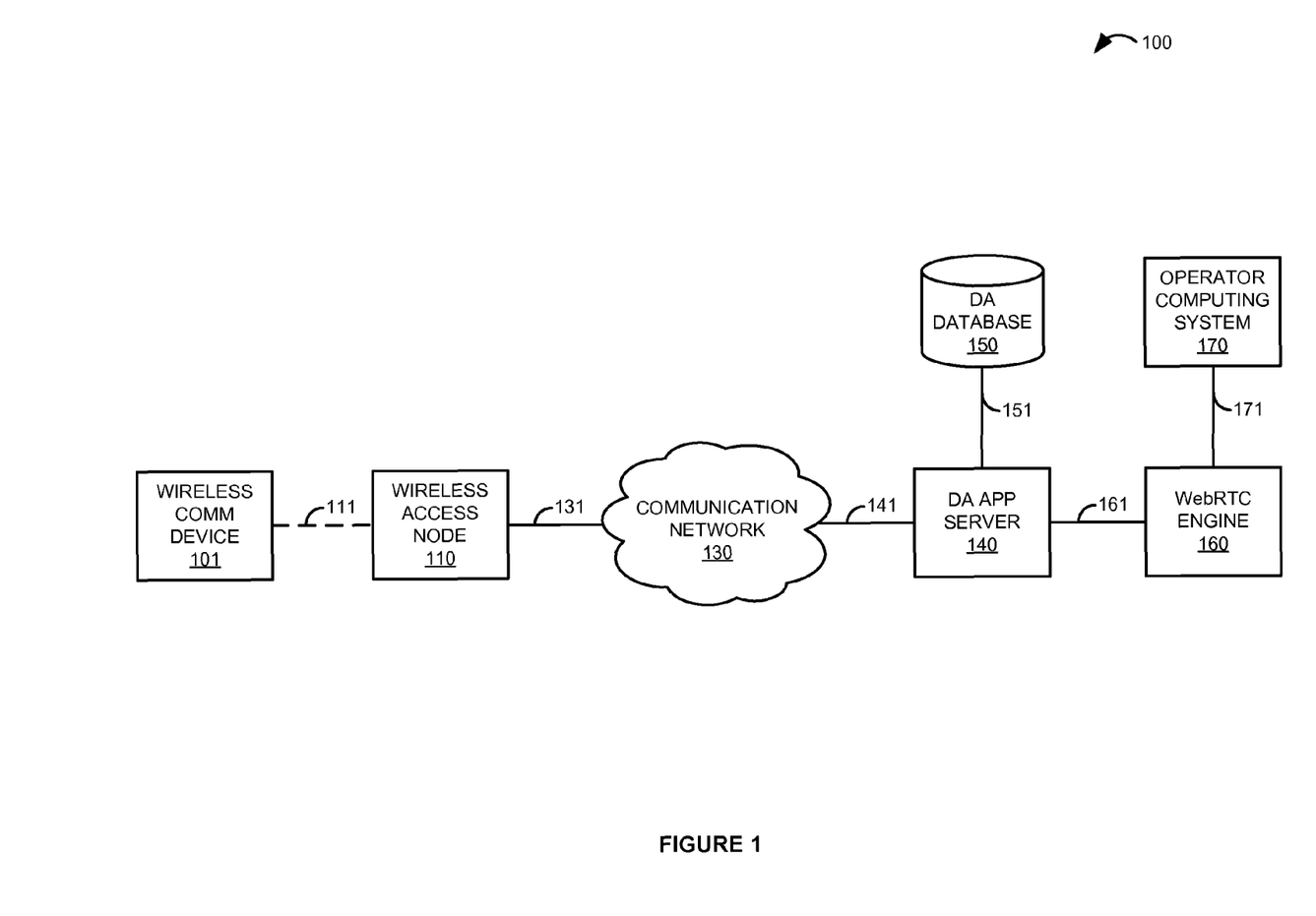
FIG. 1 is a block diagram that illustrates a communication system.

FIG. 1 is a block diagram that illustrates communication system 100. Communication system 100 includes wireless communication device 101, wireless access node 110, communication network 130, directory assistance (DA) application server 140, DA database 150, web real-time communication (WebRTC) engine 160, and operator computing system 170. Wireless communication device 101 and wireless access node 110 are in communication over wireless communication link 111. Wireless access node 110 and communication network 130 communicate over communication link 131. Communication network 130 and DA application server 140 are in communication over communication link 141. DA application server 140 and DA database 150 communicate over communication link 151. DA application server 140 and WebRTC engine 160 are in communication over communication link 161. Finally, WebRTC engine 160 and operator computing system 170 communicate over communication link 171.

Figure 2:
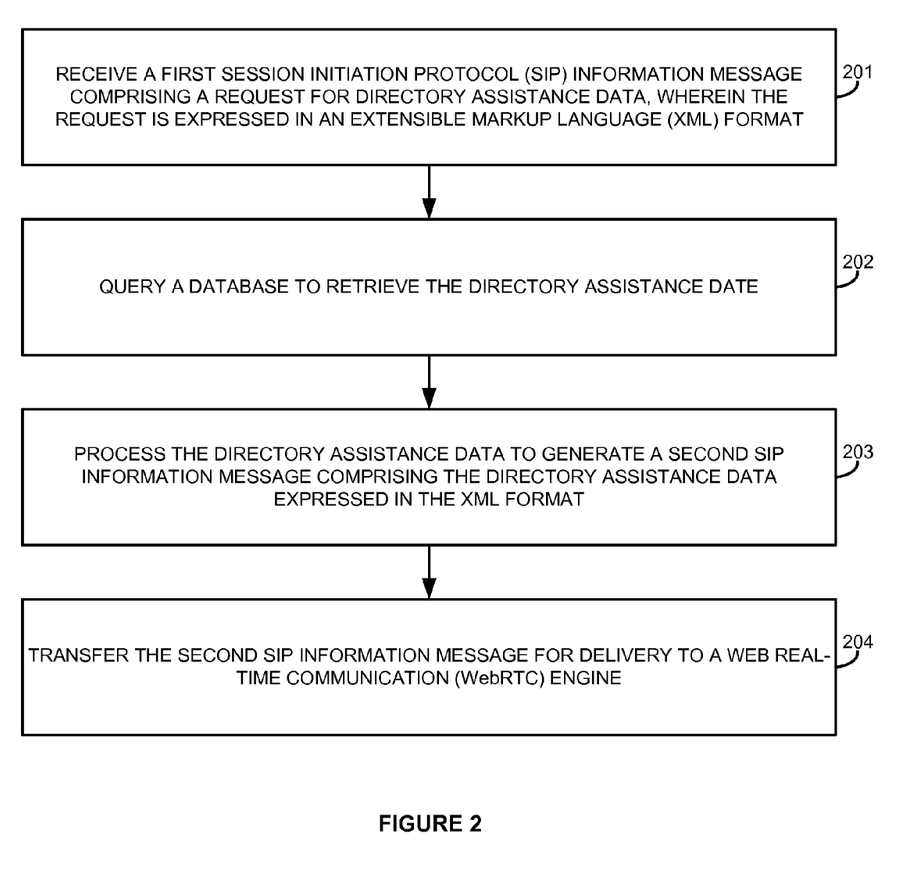
FIG. 2 is a flow diagram that illustrates an operation of the communication system.

FIG. 2 is a flow diagram that illustrates an operation of communication system 100. The steps of the operation are indicated below parenthetically. The operation of communication system 100 shown in FIG. 2 may be employed by DA application server 140 to facilitate directory assistance lookup requests involving WebRTC engine 160.

As shown in the operational flow of FIG. 2, DA application server 140 receives a first session initiation protocol (SIP) information message comprising a request for directory assistance data, wherein the request is expressed in an extensible markup language (XML) format (201). The request for directory assistance data could be received by DA application server 140 from any network, device, system, or the like, but in some examples, the request may typically be received from WebRTC engine 160 and/or a communication service provider that operates communication network 130. For example, operators of communication network 130 may outsource directory assistance services to a directory assistance service provider that operates DA application server 140. The directory assistance request is received by DA application server 140 in an XML format and wrapped in a SIP information message. In some examples, the XML format of the directory assistance request could comprise a specialized directory assistance XML (DA-XML) markup language designed for information exchanged over SIP INFO messages between DA application server 140 and WebRTC engine 160.

DA application server 140 queries DA database 150 to retrieve the directory assistance data (202). DA database 150 commonly holds directory assistance information for use in DA lookup requests, such as data that relates names, addresses, and phone numbers of subscribers to communication services. Typically, the request for directory assistance data includes some information that DA application server 140 may use to look up the directory assistance data from DA database 150. For example, the request for directory assistance data could comprise a name and location of a person and the directory assistance data retrieved from DA database 150 by DA application server 140 could comprise a telephone number associated with the person. In some examples, the directory assistance data could comprise a web form that may be used by an operator for data entry. Of course, DA application server 140 may query for other types of directory assistance data, and any information lookup from DA database 150 is within the scope of this disclosure.

DA application server 140 processes the directory assistance data to generate a second SIP information message comprising the directory assistance data expressed in the XML format (203). Typically, DA application server 140 processes the directory assistance data retrieved from DA database 150 to configure the data into the XML format, which in some examples could comprise the specialized DA-XML markup language designed for information exchanged between DA application server 140 and WebRTC engine 160 as discussed above. However, in some examples, the directory assistance data could already be stored in the XML format within DA database 150, so that the data retrieved by DA application server 140 does not require any additional formatting. Regardless, DA application server 140 encapsulates the directory assistance data expressed in the XML format within a second SIP information message.

DA application server 140 then transfers the second SIP information message for delivery to WebRTC engine 160 (204). Accordingly, WebRTC engine 160 receives the requested directory assistance information expressed in the XML format within the second SIP information message. In some examples, WebRTC engine 160 could then be configured to process the directory assistance data expressed in the XML format to translate the directory assistance data to a hyper text markup language (HTML) format, scripting language format, and/or any other browser-compatible format, and transfer the directory assistance data in the HTML format and/or scripting language format for delivery to a web browser executing on operator computing system 170. Further, WebRTC engine 160 may be configured to receive a call completion request transmitted from a web browser of an operator using operator computing system 170 and responsively transfer a third SIP information message comprising the call completion request expressed in the XML format for delivery to DA application server 140 in some examples. In this case, DA application server 140 could receive the third SIP information message comprising the call completion request expressed in the XML format and transfer a SIP refer message for delivery to a communication service provider to complete the call in response to the call completion request.

Advantageously, DA application server 140 and WebRTC engine 160 utilize an XML format to facilitate requests for and the exchange of directory assistance data using SIP information messages. By querying a database of telephone number listings stored in DA database 150, DA application server 140 is able to retrieve requested directory assistance data and configure the data into the XML format that WebRTC engine 160 is able to process. In this manner, WebRTC engine 160 may then transform the directory assistance data from the XML format into an HTML and/or scripting language format that a web browser can interpret, thereby enabling a directory assistance operator to view the requested directory assistance data on a browser executing on operator computing system 170.

Referring back to FIG. 1, wireless communication device 101 may comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNodeB), and others—including combinations thereof. Wireless network protocols that may be utilized by wireless access node 110 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Communication network 130 comprises the core network of a wireless communication service provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

DA application server 140 comprises a processing system and communication transceiver. DA application server 140 may also include other components such as a router, server, data storage system, and power supply. DA application server 140 may reside in a single device or may be distributed across multiple devices. DA application server 140 may be a discrete system or may be integrated within other systems—including other systems within communication system 100. In some examples, DA application server 140 could comprise a database system, home subscriber server (HSS), session initiation protocol (SIP) server, authentication, authorization, and accounting (AAA) server, home agent, packet data serving node (PDSN), network switch, mobile switching center, router, switching system, packet gateway, network gateway system, Internet access node, application server, service node, firewall, or some other communication system—including combinations thereof.

DA database 150 comprises a processing system and communication transceiver. DA database 150 may also include other components such as a router, server, data storage system, and power supply. DA database 150 may reside in single devices or may be distributed across multiple devices. DA database 150 may be a discrete system or may be integrated within other systems—including other systems within communication system 100. In some examples, DA database 150 could comprise a database system, session initiation protocol (SIP) server, voice over internet protocol (VoIP) gateway, VoIP control switch, authentication, authorization, and accounting (AAA) server, softswitch, home agent, packet data serving node (PDSN), network switch, mobile switching center, router, switching system, packet gateway, network gateway system, Internet access node, application server, service node, firewall, or some other communication system—including combinations thereof.

WebRTC engine 160 comprises a processing system and communication transceiver. WebRTC engine 160 may also include other components such as a router, server, data storage system, and power supply. WebRTC engine 160 may reside in a single device or may be distributed across multiple devices. WebRTC engine 160 may be a discrete system or may be integrated within other systems—including other systems within communication system 100. In some examples, WebRTC engine 160 could comprise a database system, home subscriber server (HSS), session initiation protocol (SIP) server, authentication, authorization, and accounting (AAA) server, home agent, packet data serving node (PDSN), network switch, mobile switching center, router, switching system, packet gateway, network gateway system, Internet access node, application server, service node, firewall, or some other communication system—including combinations thereof.

Operator computing system 170 comprises a processing system and communication transceiver. Operator computing system 170 may also include other components such as a router, server, data storage system, and power supply. Operator computing system 170 may reside in a single device or may be distributed across multiple devices. Operator computing system 170 may be a discrete system or may be integrated within other systems—including other systems within communication system 100. In some examples, operator computing system 170 could comprise a wireless communication device, personal computer, telephone, tablet, transceiver, smartphone, PDA, e-book, game console, mobile Internet device, wireless network interface card, media player, Internet access node, application server, service node, or some other computing apparatus—including combinations thereof.

Wireless communication link 111 uses the air or space as the transport medium. Wireless communication link 111 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication links 131, 141, 151, 161, and 171 use metal, air, space, optical fiber such as glass or plastic, or some other material as the transport medium—including combinations thereof. Communication links 131, 141, 151, 161, and 171 could use various communication protocols, such as TDM, IP, Ethernet, telephony, optical networking, hybrid fiber coax (HFC), communication signaling, wireless protocols, or some other communication format—including combinations thereof. Communication links 131, 141, 151, 161, and 171 may be direct links or could include intermediate networks, systems, or devices.

Figure 3:
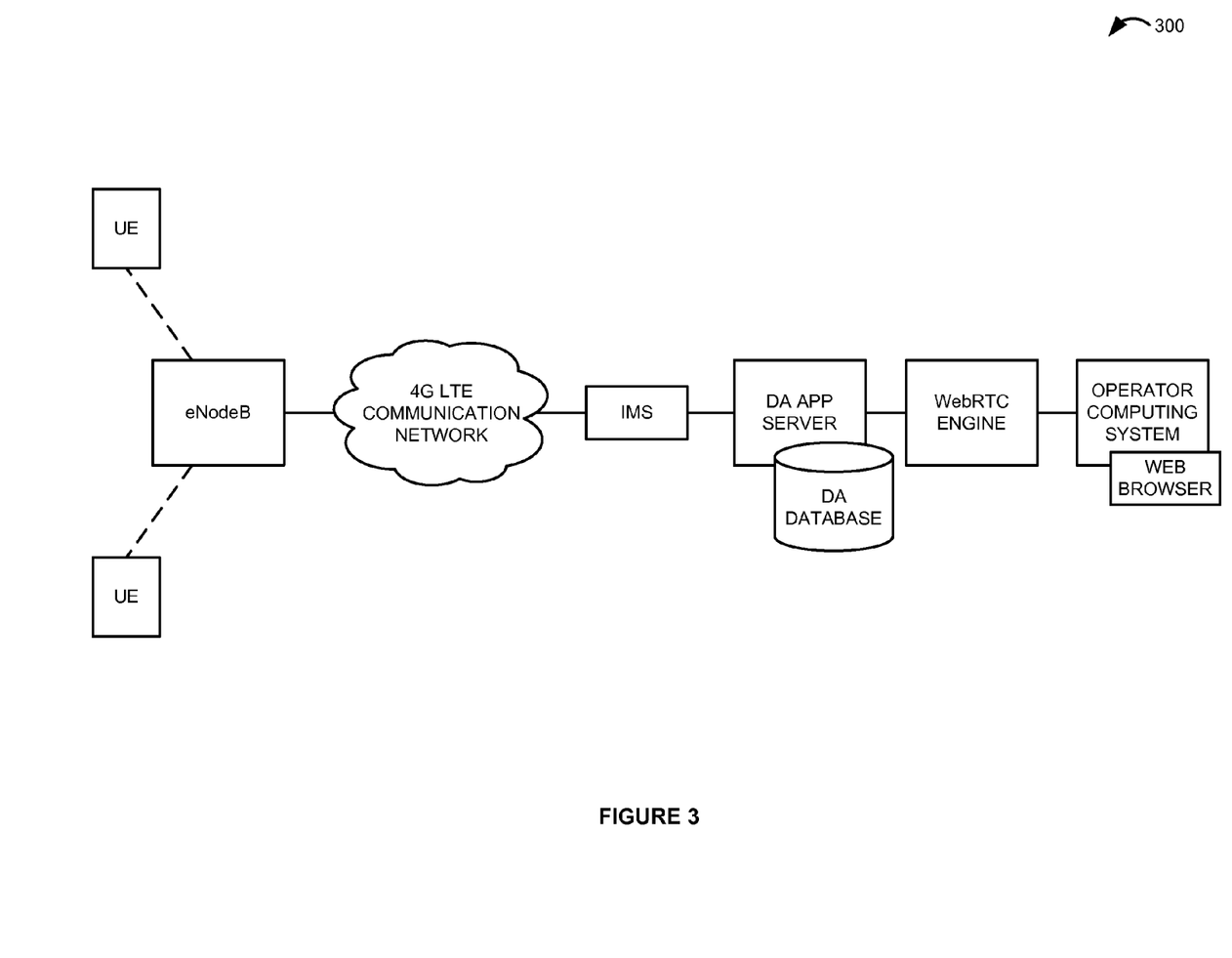
FIG. 3 is a block diagram that illustrates a communication system in an exemplary embodiment.

FIG. 3 is a block diagram that illustrates communication system 300 in an exemplary embodiment. Communication system 300 includes an enhanced Node B (eNodeB) base station that is serving two user equipment (UE) devices. The eNodeB base station is in communication with a fourth generation (4G) LTE communication network. The 4G LTE communication network could include various network elements typically found in an LTE network, such as a mobility management entity (MME), serving gateway (SGW), packet data network gateway (PGW), and others, but such detail is not shown for clarity. The 4G LTE communication network interacts with an IP multimedia subsystem (IMS) that is also linked to a directory assistance (DA) application server. The DA application server includes a DA database that holds telephone listings and other information. The DA application server and a WebRTC engine are also operatively linked. The WebRTC engine is in communication with an operator computing system executing a web browser application.

In operation, a carrier that operates the 4G LTE communication network may route calls that need operator assistance to a directory assistance service provider in order to search for business or personal telephone number listings. Typically, most carriers outsource directory assistance services, such as 411 and NPA-555-1212, by routing such calls to a DA application server of a DA service provider. The DA application server includes a DA database, and the DA application server can query the DA database to look up requested telephone number listings and other directory assistance information. In a VoIP IMS architecture, where a carrier routes directory assistance calls to the DA application server of a third party DA service provider utilizing WebRTC-enabled operators, the interaction between the caller and the operator needs to be defined and communicated between the WebRTC engine and the DA application server for listings lookup and call completion handling. To this end, a new markup language, termed directory assistance XML (DA-XML), defines the packaged information exchange over SIP INFO messages between the DA application server and the WebRTC engine. In addition, at the WebRTC engine, where SIP signaling messages are translated to a WebRTC JavaScript format and real-time transport protocol (RTP) streams are transcoded and bridged, a new transformation engine converts the DA-XML packages to WebRTC JavaScript and/or HTML formats, for all the data exchanged between the WebRTC engine and the operator's browser. A detailed description of how the DA application server and WebRTC engine might exchange information in this manner will now be discussed with respect to FIGS. 4, 5, and 6.

Figure 4:
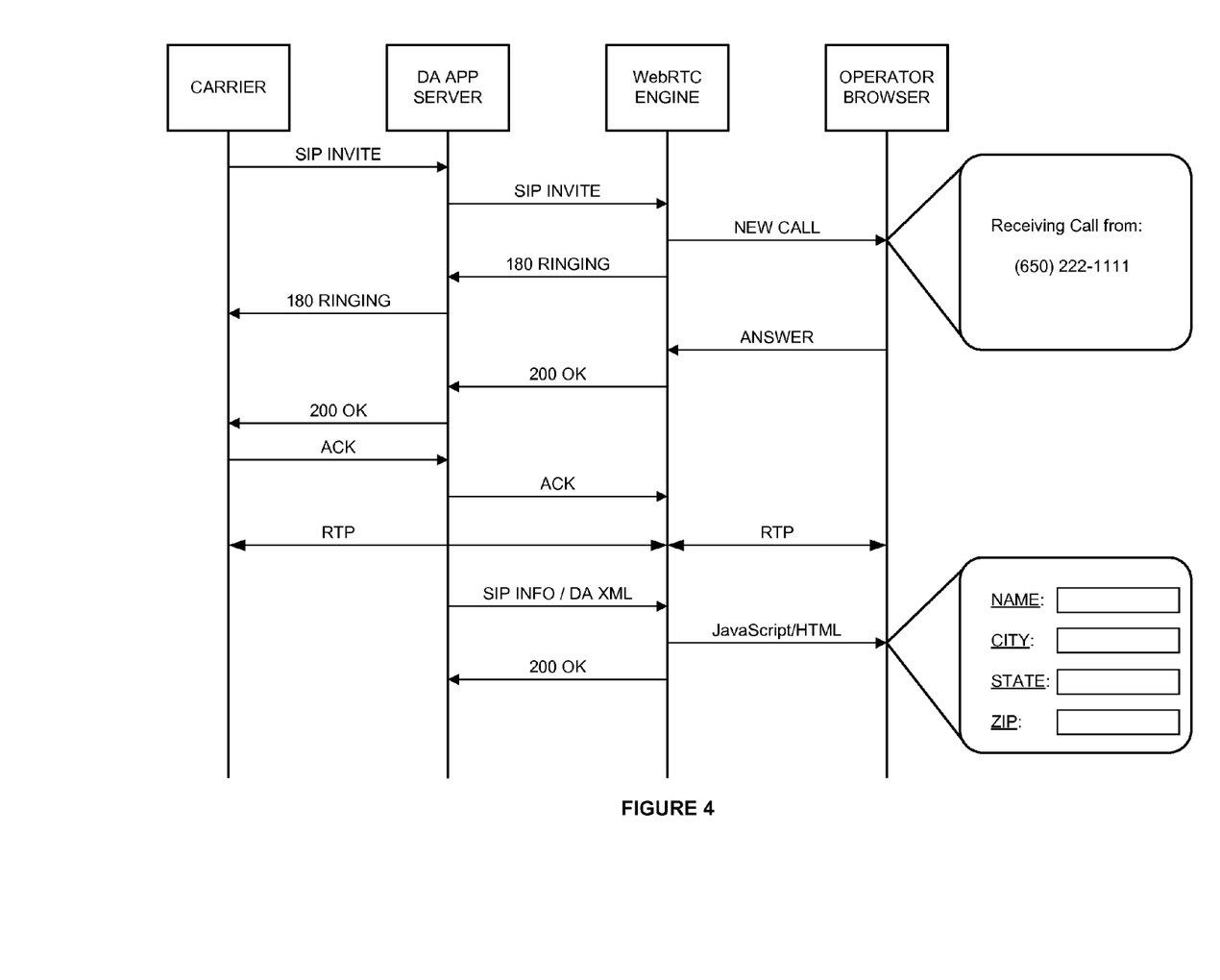
FIG. 4 is a sequence diagram that illustrates an operation of a communication system in an exemplary embodiment.

FIG. 4 is a sequence diagram that illustrates an operation of communication system 300 in an exemplary embodiment. The sequence diagram of FIG. 4 provides an example of the carrier routing a VoIP IMS call requiring directory assistance service to an operator of a third party DA service provider. Initially, the carrier transfers a SIP INVITE message to the DA application server, which in turn forwards the SIP INVITE message to the WebRTC engine. The WebRTC engine routes the call to the operator's computing system in an HTML/JavaScript format for display on the operator's web browser. As shown in FIG. 4, the operator's browser might then display the calling number of the caller's UE device. The WebRTC engine sends a "180 RINGING" message to the DA application server which forwards this message to the carrier. When the operator answers the call, the WebRTC engine sends a "200 OK" message to the DA application server which forwards this message to the carrier in order to inform the carrier that the call was answered. The carrier sends an ACK message back to the DA application server to acknowledge the call has been answered, and the DA application server forwards the ACK message from the carrier on to the WebRTC engine.

An RTP session is then established between the carrier and the WebRTC engine and between the WebRTC engine and the operator's computing system. The DA application server then send a SIP INFO message to the WebRTC engine comprising information encoded in the DA-XML format described above. The WebRTC engine receives the SIP INFO message comprising the DA-XML data and converts the data from the DA-XML format into JavaScript and HTML that the operator's browser is capable of displaying. The WebRTC engine then provides the data in the JavaScript/HTML format to the operator's computing system for display on the operator's browser, and sends a "200 OK" message back to the DA application server. In this example, the directory assistance data contained in the SIP INFO message is a blank web form that the operator may use to input a name, city, state, and zip code of a telephone service subscriber. An example of how the DA operator might use this web form to request a telephone number of a subscriber will now be discussed with respect to FIG. 5.

Figure 5:
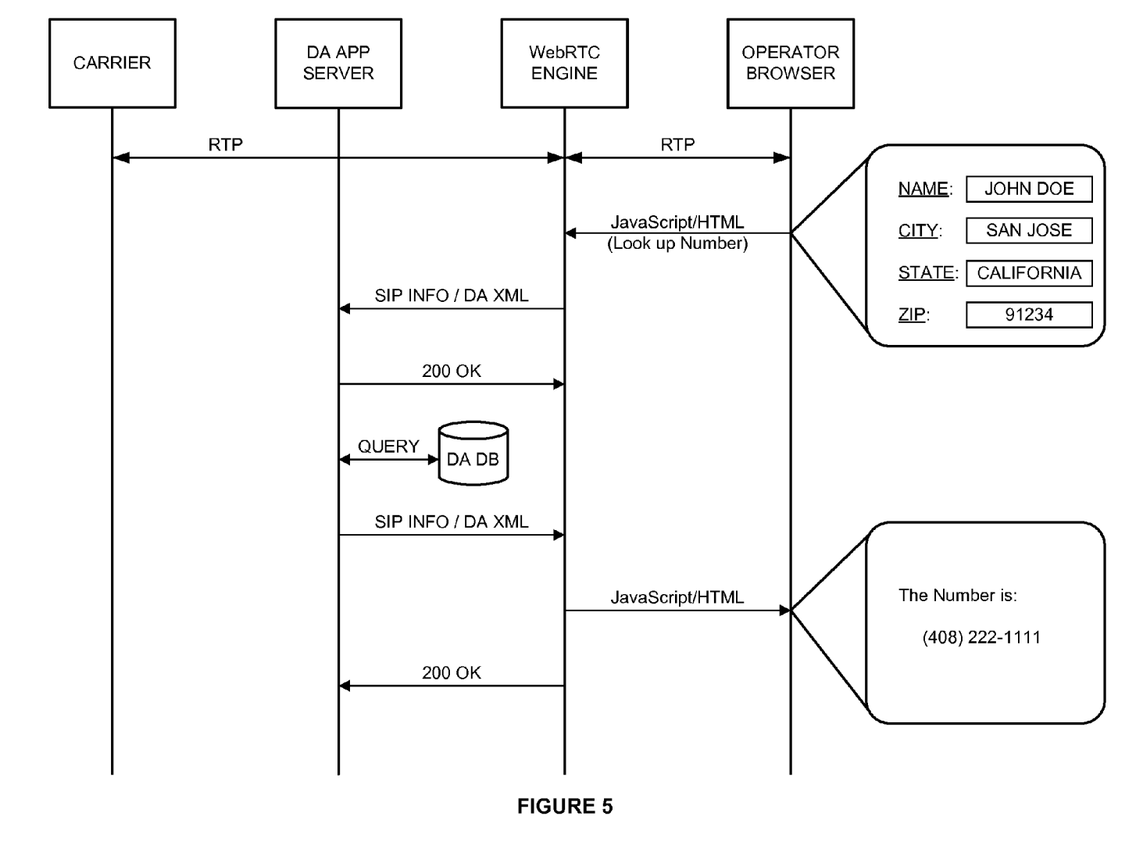
FIG. 5 is a sequence diagram that illustrates an operation of a communication system in an exemplary embodiment.

FIG. 5 is a sequence diagram that illustrates an operation of communication system 300 in an exemplary embodiment. The sequence diagram of FIG. 5 provides an example of how a DA operator might utilize a web form to request a telephone number of a subscriber on behalf of a caller. Initially, a new or existing RTP session is established between the carrier and the WebRTC engine and between the WebRTC engine and the operator's computing system. The caller provides the operator with the lookup request details, providing the name, city, state, and zip code of the subscriber whose telephone number the caller is requesting, as shown in FIG. 5. The operator's browser accepts the information input by the operator into the web entry form and sends this information to the WebRTC engine in a JavaScript/HTML format, along with instructions for the WebRTC engine to look up the telephone number of the identified subscriber. The WebRTC engine extracts the information from the JavaScript/HTML code and converts the data into the DA-XML format that the DA application server can process. The WebRTC engine then encapsulates the DA-XML data into a SIP INFO message and transfers the SIP INFO message to the DA application server.

Upon successfully receiving the SIP INFO message comprising the request details in the DA-XML format, the DA application server sends a "200 OK" message back to the WebRTC engine. The DA application server then queries the DA database for the telephone number of the subscriber identified in the directory assistance request, which is John Doe in this example. After the DA application server retrieves the telephone number for John Doe from the DA database, the DA application server prepares a SIP INFO message containing the telephone number in the DA-XML format, and transfers this SIP INFO message for delivery to the WebRTC engine. The WebRTC engine processes the SIP INFO message to extract the telephone number from the DA data in the DA-XML format and generates a JavaScript/HTML format for display on the operator's browser. The WebRTC engine then transfers the telephone number for John Doe to the operator's computing system in the JavaScript/HTML format for display on the operator's browser as shown in FIG. 5 and sends a "200 OK" message back to the DA application server. In this manner, the operator can then view the requested telephone number for John Doe and provide this information to the caller requesting the number. An example of how a call completion request might be handled to transfer the call to the retrieved number will now be discussed with respect to FIG. 6.

Figure 6:
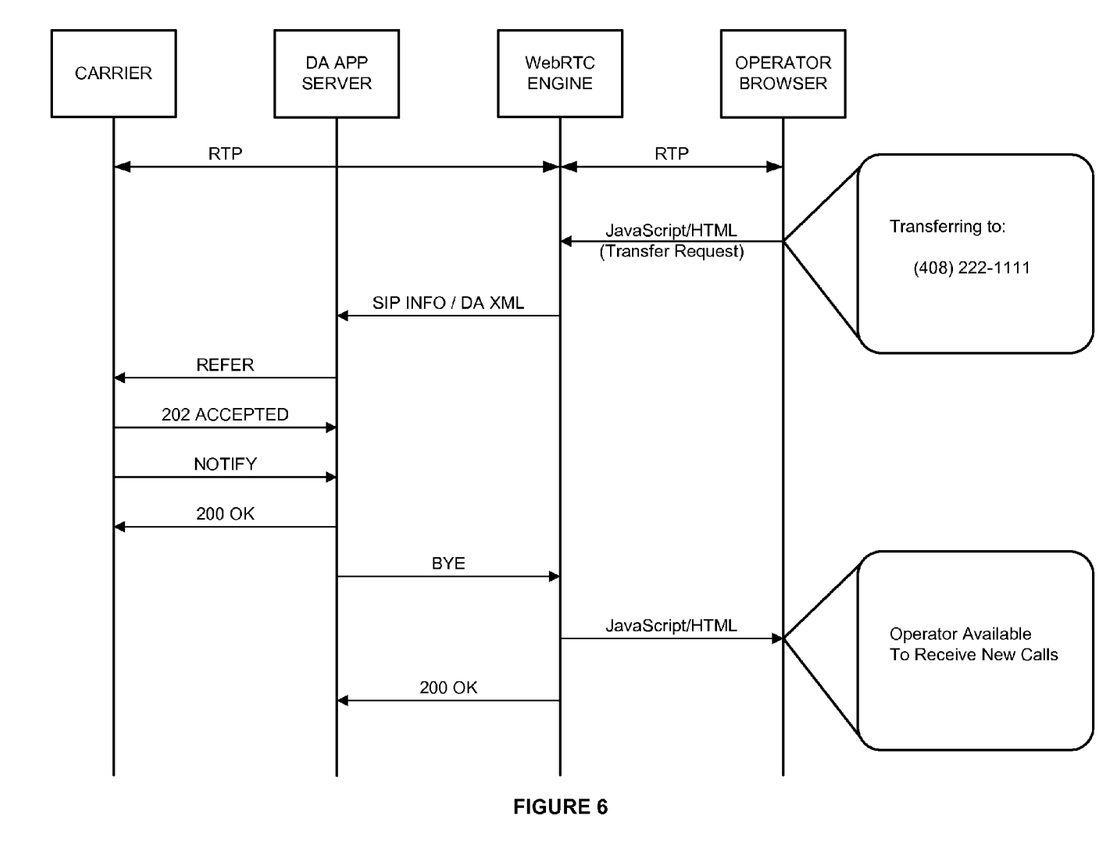
FIG. 6 is a sequence diagram that illustrates an operation of a communication system in an exemplary embodiment.

FIG. 6 is a sequence diagram that illustrates an operation of communication system 300 in an exemplary embodiment. The sequence diagram of FIG. 6 provides an example of how a DA operator might issue a call transfer request for call completion if so requested by the caller. Initially, a new or existing RTP session is established between the carrier and the WebRTC engine and between the WebRTC engine and the operator's computing system. To effectuate call completion to a specified telephone number on behalf of the caller, the operator utilizes the browser to send a transfer request to the WebRTC engine in a JavaScript/HTML format. The WebRTC engine receives the transfer request, transforms the request into the DA-XML format, and sends the DA-XML-formatted transfer request in a SIP INFO message to the DA application server.

The DA application server receives the SIP INFO message comprising the transfer request in the DA-XML format and responsively sends a transfer and bridge out SIP REFER message to the carrier. The carrier responds to the SIP REFER message by sending a "202 ACCEPTED" message to the DA application server. The carrier then sends a SIP NOTIFY message to the DA application server and the DA application server responds by sending a "200 OK" message back to the carrier. The DA application server then sends a SIP BYE message to the WebRTC engine to indicate the call has been transferred to the specified telephone number and the operator is no longer a party to the call. The WebRTC engine generates JavaScript/HTML code and sends the JavaScript/HTML to the operator's computing system. When displayed by the operator's browser, the JavaScript/HTML indicates that the operator is available to receive new calls, as shown in FIG. 6. The WebRTC engine then sends a "200 OK" message back to the DA application server. In this manner, a WebRTC-enabled operator can request telephone number lookups and transfer the call to that listing through the carrier's network for call completion.

Figure 7:
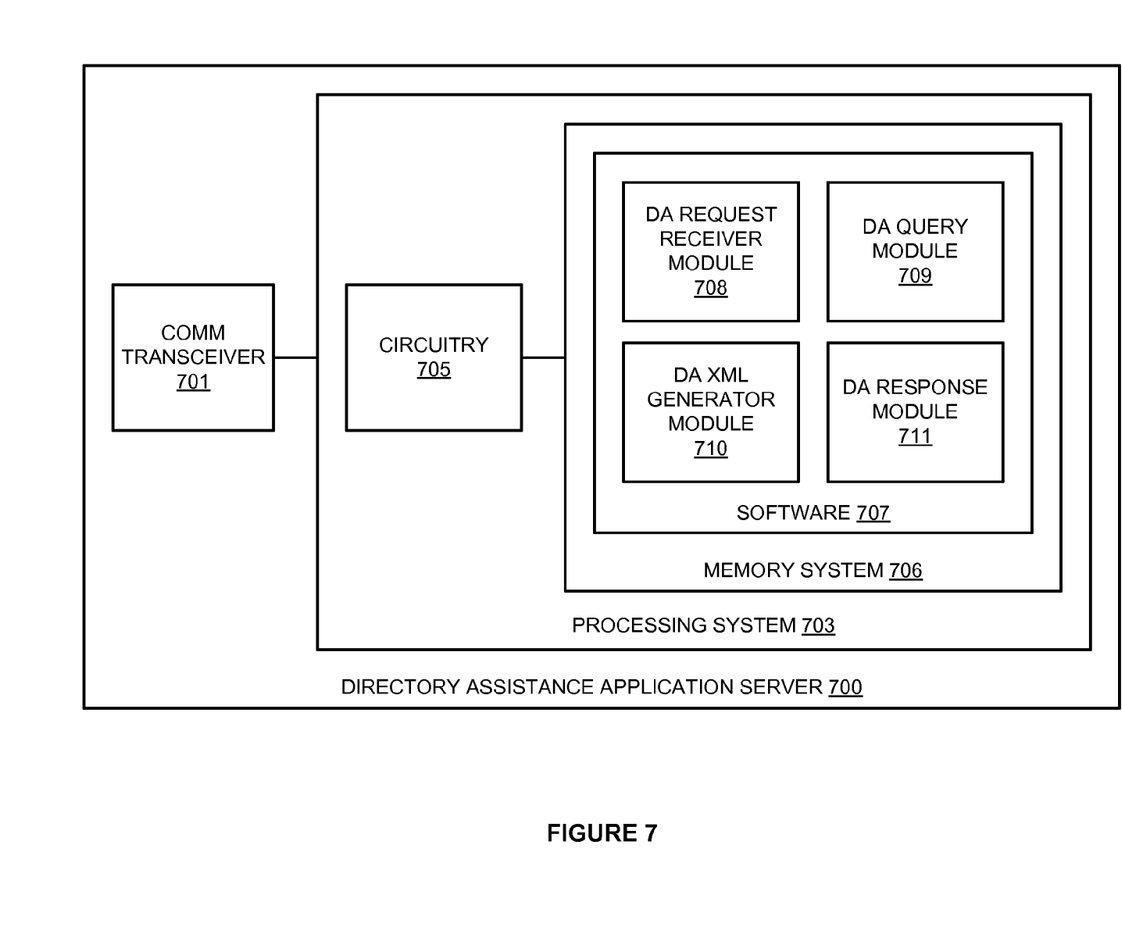
FIG. 7 is a block diagram that illustrates a directory assistance application server.

FIG. 7 is a block diagram that illustrates directory assistance application server 700. Directory assistance application server 700 provides an example of directory assistance application server 140, although server 140 may use alternative configurations. Directory assistance application server 700 comprises communication transceiver 701 and processing system 703. Processing system 703 is linked to communication transceiver 701. Processing system 703 includes processing circuitry 705 and memory device 706 that stores operating software 707. Operating software 707 comprises software modules 708-711.

Communication transceiver 701 comprises components that communicate over communication links, such as network cards, ports, RF transceivers, processing circuitry and software, or some other communication components. Communication transceiver 701 may be configured to communicate over metallic, wireless, or optical links. Communication transceiver 701 may be configured to use TDM, IP, Ethernet, optical networking, wireless protocols, communication signaling, or some other communication format—including combinations thereof. Communication transceiver 701 could be configured to receive a first session initiation protocol (SIP) information message comprising a request for directory assistance data, wherein the request is expressed in an extensible markup language (XML) format. Communication transceiver 701 could also be configured to transfer the second SIP information message for delivery to the WebRTC engine.

Processing circuitry 705 comprises microprocessor and other circuitry that retrieves and executes operating software 707 from memory system 706. Processing circuitry 705 may comprise a single device or could be distributed across multiple devices—including devices in different geographic areas. Processing circuitry 705 may be embedded in various types of equipment. Memory system 706 comprises a non-transitory computer readable storage medium, such as a disk drive, flash drive, data storage circuitry, or some other hardware memory apparatus. Memory system 706 may comprise a single device or could be distributed across multiple devices—including devices in different geographic areas. Memory system 706 may be embedded in various types of equipment. In some examples, a computer apparatus could comprise memory system 706 and operating software 707. Operating software 707 comprises computer programs, firmware, or some other form of machine-readable processing instructions. Operating software 707 may include an operating system, utilities, drivers, network interfaces, applications, or some other type of software. In this example, operating software 707 comprises software modules 708-711, although software 707 could have alternative configurations in other examples.

When executed by circuitry 705, operating software 707 directs processing system 703 to operate as described herein for directory assistance application server 140. In particular, operating software 707 may direct processing system 703 to direct communication transceiver 701 to receive a first session initiation protocol (SIP) information message comprising a request for directory assistance data, wherein the request is expressed in an extensible markup language (XML) format. Operating software 707 further directs processing system 703 to query a directory assistance database to retrieve the directory assistance data. Operating software 707 also directs processing system 703 to process the directory assistance data to generate a second SIP information message comprising the directory assistance data expressed in the XML format. Finally, operating software 707 directs processing system 703 to direct communication transceiver 701 to transfer the second SIP information message for delivery to the WebRTC engine.

In some examples, operating software 707 could comprise a DA request receiver software module 708 that receives a first session initiation protocol (SIP) information message comprising a request for directory assistance data, wherein the request is expressed in an extensible markup language (XML) format. Additionally, operating software 707 could comprise a DA query software module 709 that queries a directory assistance database to retrieve the directory assistance data. Further, operating software 707 could comprise a DA XML generator software module 710 that processes the directory assistance data to generate a second SIP information message comprising the directory assistance data expressed in the XML format. Finally, operating software 707 could comprise a DA response software module 711 that transfers the second SIP information message for delivery to the WebRTC engine.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a directory assistance (DA) application server to facilitate directory assistance lookup requests involving a web real-time communication (WebRTC) engine, the method comprising:
   receiving a first session initiation protocol (SIP) information message comprising a request for directory assistance data, wherein the request is expressed in an extensible markup language (XML) format;
   querying a directory assistance database to retrieve the directory assistance data;
   processing the directory assistance data to generate a second SIP information message comprising the directory assistance data expressed in the XML format; and
   transferring the second SIP information message for delivery to the WebRTC engine, wherein the WebRTC engine is configured to process the second SIP information message to extract the directory assistance data expressed in the XML format, process the directory assistance data to translate the directory assistance data expressed in the XML format to a browser-compatible format, and transfer the directory assistance data in the browser-compatible format.

2. The method of claim 1 wherein the WebRTC engine configured to process the directory assistance data to translate the directory assistance data expressed in the XML format to the browser-compatible format and transfer the directory assistance data in the browser-compatible format comprises the WebRTC engine configured to process the directory assistance data expressed in the XML format to translate the directory assistance data to a hyper text markup language (HTML) format and transfer the directory assistance data in the HTML format for delivery to a web browser of an operator.

3. The method of claim 1 wherein the WebRTC engine configured to process the directory assistance data to translate the directory assistance data expressed in the XML format to the browser-compatible format and transfer the directory assistance data in the browser-compatible format comprises the WebRTC engine configured to process the directory assistance data expressed in the XML format to translate the directory assistance data to a scripting language format and transfer the directory assistance data in the scripting language format for delivery to a web browser of an operator.

4. The method of claim 1 wherein the WebRTC engine is configured to receive a call completion request transmitted from a web browser of an operator and responsively transfer a third SIP information message comprising the call completion request expressed in the XML format for delivery to the DA application server.

5. The method of claim 4 further comprising receiving the third SIP information message comprising the call completion request expressed in the XML format and transferring a SIP refer message for delivery to a communication service provider in response to the call completion request.

6. The method of claim 1 wherein the request for directory assistance data comprises a name and location of a person and the directory assistance data comprises a telephone number associated with the person.

7. The method of claim 1 wherein the directory assistance data comprises a web form.

8. A directory assistance (DA) application server to facilitate directory assistance lookup requests involving a web real-time communication (WebRTC) engine, the DA application server comprising:
   a communication transceiver configured to receive a first session initiation protocol (SIP) information message comprising a request for directory assistance data, wherein the request is expressed in an extensible markup language (XML) format; and
   a processing system configured to query a directory assistance database to retrieve the directory assistance data and process the directory assistance data to generate a second SIP information message comprising the directory assistance data expressed in the XML format;
   the communication transceiver further configured to transfer the second SIP information message for delivery to the WebRTC engine, wherein the WebRTC engine is configured to process the second SIP information message to extract the directory assistance data expressed in the XML format, process the directory assistance data to translate the directory assistance data expressed in the XML format to a browser-compatible format and transfer the directory assistance data in the browser-compatible format.

9. The DA application server of claim 8 wherein the WebRTC engine configured to process the directory assistance data to translate the directory assistance data expressed in the XML format to the browser-compatible format and transfer the directory assistance data in the browser-compatible format comprises the WebRTC engine configured to process the directory assistance data expressed in the XML format to translate the directory assistance data to a hyper text markup language (HTML) format and transfer the directory assistance data in the HTML format for delivery to a web browser of an operator.

10. The DA application server of claim 8 wherein the WebRTC engine configured to process the directory assistance data to translate the directory assistance data expressed in the XML format to the browser-compatible format and transfer the directory assistance data in the browser-compatible format comprises the WebRTC engine configured to process the directory assistance data expressed in the XML format to translate the directory assistance data to a scripting language format and transfer the directory assistance data in the scripting language format for delivery to a web browser of an operator.

11. The DA application server of claim 8 wherein the WebRTC engine is configured to receive a call completion request transmitted from a web browser of an operator and responsively transfer a third SIP information message comprising the call completion request expressed in the XML format for delivery to the DA application server.

12. The DA application server of claim 11 wherein the communication transceiver is further configured to receive the third SIP information message comprising the call completion request expressed in the XML format and transfer a SIP refer message for delivery to a communication service provider in response to the call completion request.

13. The DA application server of claim 8 wherein the request for directory assistance data comprises a name and location of a person and the directory assistance data comprises a telephone number associated with the person.

14. The DA application server of claim 8 wherein the directory assistance data comprises a web form.

15. An article of manufacture to operate a directory assistance (DA) application server to facilitate directory assistance lookup requests involving a web real-time communication (WebRTC) engine, the article of manufacture comprising:
   software instructions configured, when executed by the DA application server, to direct the DA application server to receive a first session initiation protocol (SIP) information message comprising a request for directory assistance data, wherein the request is expressed in an extensible markup language (XML) format, query a directory assistance database to retrieve the directory assistance data, process the directory assistance data to generate a second SIP information message comprising the directory assistance data expressed in the XML format, and transfer the second SIP information message for delivery to the WebRTC engine, wherein the WebRTC engine is configured to process the second SIP information message to extract the directory assistance data expressed in the XML format, process the directory assistance data to translate the directory assistance data expressed in the XML format to a browser-compatible format, and transfer the directory assistance data in the browser-compatible format; and
   at least one non-transitory computer-readable storage medium storing the software instructions.

16. The article of manufacture of claim 15 wherein the WebRTC engine configured to process the directory assistance data to translate the directory assistance data expressed in the XML format to the browser-compatible format and transfer the directory assistance data in the browser-compatible format comprises the WebRTC engine configured to process the directory assistance data expressed in the XML format to translate the directory assistance data to a hyper text markup language (HTML) format and transfer the directory assistance data in the HTML format for delivery to a web browser of an operator.

17. The article of manufacture of claim 15 wherein the WebRTC engine configured to process the directory assistance data to translate the directory assistance data expressed in the XML format to the browser-compatible format and transfer the directory assistance data in the browser-compatible format comprises the WebRTC engine configured to process the directory assistance data expressed in the XML format to translate the directory assistance data to a scripting language format and transfer the directory assistance data in the scripting language format for delivery to a web browser of an operator.

18. The article of manufacture of claim 15 wherein the WebRTC engine is configured to receive a call completion request transmitted from a web browser of an operator and responsively transfer a third SIP information message comprising the call completion request expressed in the XML format for delivery to the DA application server.

19. The article of manufacture of claim 18 wherein the software instructions are further configured to direct the DA application server to receive the third SIP information message comprising the call completion request expressed in the XML format and transfer a SIP refer message for delivery to a communication service provider in response to the call completion request.

20. The article of manufacture of claim 15 wherein the request for directory assistance data comprises a name and location of a person and the directory assistance data comprises a telephone number associated with the person.

\* \* \* \* \*